United States Patent
Smyth et al.

(10) Patent No.: US 9,982,829 B2
(45) Date of Patent: May 29, 2018

(54) EXTERNAL PIPE REINFORCEMENT

(71) Applicant: Petrosleeve Incorporated, Nisku (CA)

(72) Inventors: Robert James Smyth, Calgary (CA); Darcy Evan Miller, Edmonton (CA); Michael Alvin Miller, Leduc (CA)

(73) Assignee: PETROSLEEVE INCORPORATED, Nisku (CA)

( * ) Notice: Subject to any disclaimer, the term of this patent is extended or adjusted under 35 U.S.C. 154(b) by 85 days.

(21) Appl. No.: 15/073,630

(22) Filed: Mar. 17, 2016

(65) Prior Publication Data

US 2016/0334045 A1 Nov. 17, 2016

(30) Foreign Application Priority Data

May 15, 2015 (CA) ..................................... 2891701

(51) Int. Cl.
- *F16L 55/172* (2006.01)
- *F16L 55/17* (2006.01)
- *F16L 13/00* (2006.01)

(52) U.S. Cl.
CPC ............. *F16L 55/172* (2013.01); *F16L 55/17* (2013.01); *F16L 13/004* (2013.01)

(58) Field of Classification Search
CPC ........ F16L 55/172; F16L 55/17; F16L 13/004
USPC ...... 138/98, 97, 99, 156, 158, 159, 170, 171
See application file for complete search history.

(56) References Cited

U.S. PATENT DOCUMENTS

| | | | | |
|---|---|---|---|---|
| 3,685,545 A | * | 8/1972 | Smith | F16L 1/26 138/99 |
| 5,722,463 A | * | 3/1998 | Smyth | F16L 55/17 138/158 |

\* cited by examiner

*Primary Examiner* — Craig Schneider
*Assistant Examiner* — David Deal
(74) *Attorney, Agent, or Firm* — Thomas E. Malyszko

(57) ABSTRACT

An external sleeve arrangement for repairing a defective length of pipe has top and bottom segments for substantially encircling the pipe, where the bottom segment in addition has connector plates welded on either side. When the pipe and sleeve segments are made of a similar material, the sleeve segments are made thicker than the pipe wall, up to three times as thick or more, so that upon heating the sleeve segments for a given time they stretch relative to the pipe. After joining the stretched sleeve segments with the connector plates to form a continuous circumferential sleeve, the sleeve is cooled to provide an enhanced interference fit to reinforce the defective length of pipe. Prior to heating, the sleeve segments are clamped about the pipe using a clamping mechanism employing lugs connected to the segments and screw jacks engaging those lugs to draw the segments tight to the pipe.

20 Claims, 8 Drawing Sheets

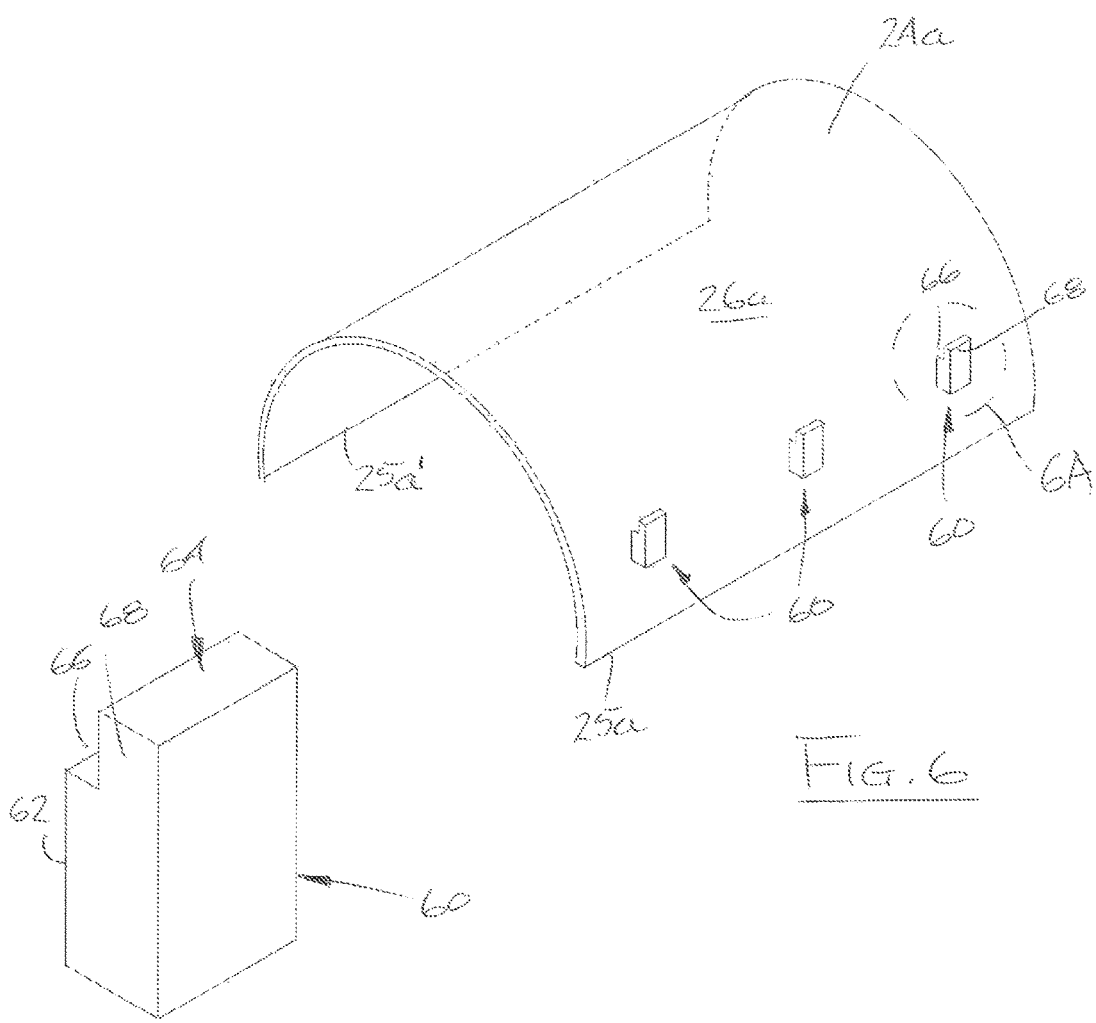

EXTERNAL PIPE REINFORCEMENT

FIELD OF THE INVENTION

The present invention relates to pipe reinforcement, and in particular to an improved external sleeve arrangement for repairing, including reinforcing or pressure containing, perforated and unperforated pipes that transport fluids under pressure, such as those used in the oil and gas industry, including improved clamping of such sleeve arrangement.

BACKGROUND OF THE INVENTION

Pipes for transporting fluids, particularly those used in the oil and gas industry, that are subject to defects such as corrosion, mill defects, stress corrosion cracking, and hydrogen induced cracking. Known methods of dealing with such defective pipes are described in the background of applicant's Canadian patent 2,164,011 and U.S. Pat. No. 5,722,463, and are briefly reviewed herein.

Pipe wall defects have the potential to cause failures during operation, and the usual methods of preventing such failures are either to remove the defect by cutting out a section of the pipe, or by significantly reducing the internal pressure in the pipe prior to either welding a pressure containing sleeve onto the pipe or by applying a mechanically tightened or fibre glass sleeve to the pipe. A disadvantage of these prior methods is that they may require pipe system shut downs and a resultant loss of throughput of product in the pipe. For instance, shut downs are typically required where sleeves are welded directly to a pipe. Such methods also involve occupational hazards, potential metallurgical failures, and costly expenditures. Another disadvantage is that prior art sleeves, if installed while the pipe is under operating pressures, can loosen and separate from the pipe if the operating pressure later drops for any reason. As a result, prior art sleeves require frequent maintenance, repair and replacement, which adds significantly to the operating costs of a pipe.

The sleeve assembly described in applicant's Canadian and US patents addresses the limitations and disadvantages of the prior art by not being welded to the pipe, and being capable of installation whether the pipe is pressurized (i.e. operating) or not. If installed while the pipe is pressurized, the sleeve remains firmly secured to the pipe upon depressurization or shut down, and is relatively quickly and economically installed. However, these types of prior art sleeve assemblies are directed to repairing pipes with anomalies or corrosion which affect or extend radially through only a portion of the pipe wall, namely partially corroded or unperforated pipes.

What is desired, however, is a pipe reinforcement with an improved external sleeve for repairing not only unperforated pipes that transport fluids under pressure, but also perforated pipes (i.e. where pipe wall is corroded or cracked between the interior and exterior surfaces). Preferrably the improved external sleeve should provide greater compressive forces onto the underlying pipe, particularly onto larger diameter pipes (30 inches/76 cm or more), for a given amount of heat input, but is equally effective on smaller diameter pipes (under 30 in/76 cm). The pipe reinforcement should include an improved method of clamping such improved external sleeve on a pipe, including larger diameter pipes. The clamping method should include screw jacks that are mountable onto the sleeves for holding the sleeves on the pipe during the sleeve mounting process, which may be removed from the sleeves when finishing the sleeve mounting process, and which omit the use of a chain assembly extending circumferentially about the pipe.

SUMMARY OF THE INVENTION

Applicant's sleeve assembly and method of reinforcing a pipe, as described in the above-noted patents, arose from the concept that the circumference of the sleeve to be placed about a pipe should be slightly less than that required to completely encircle that pipe. This "circumference differential", or "deficiency", allows the sleeve to be circumferentially "stretched" relative to the pipe wall and placed in tension about the pipe, putting the underlying pipe wall into compression. The tensioned sleeve should remain tight about the pipe through all operating ranges, and so the radial compressive force in the pipe wall should keep pipe defects (such as longitudinal stress cracks) in compression and prevent them from propogating.

The "stretch" in the sleeve is generated by heating the sleeve—typically composed of two steel sleeve segments or "halves"—when mounted snugly on the pipe, but avoiding heating of the pipe, with the aim of expanding the sleeve segments more than the underlying pipe wall. This stretch is then "captured" by tying the heated sleeve segments together into a unified sleeve, typically by welding. As the unified sleeve cools, it attempts to contract and recover the circumference differential, which should generate sufficient tension to create an interference fit with the underlying pipe.

It has been generally accepted that the sleeve should be no thicker than the pipe, so that the sleeve can heat and expand faster than the underlying pipe, to create the desired stretch (relative to the pipe) and the eventual interference fit upon cooling. However, applicant has investigated this process in greater detail, to better understand the mechanics of pipe reinforcement using sleeves, including the function of temperature differential between sleeve and pipe, particularly when dealing with larger pipes (30 in/76 cm diameter and greater). One motivation was a desire to achieve better compression on large pipes, as known external sleeve arrangements seemed to be lacking.

Referring first to FIG. 1, it shows the temperature profile of a conventional steel sleeve, referred to herein as a "thin" sleeve (i.e. a sleeve having a thickness equal to or less than the pipe wall), that is mounted externally on a steel pipe with substantially the same material properties as the sleeve, wherein the sleeve is heated over a given time frame. In the instant case the sleeve thickness was chosen to approximate the pipe thickness. As heating of the sleeve commences, the sleeve temperature (identified by the line ST-thin) remains consistently higher than the underlying pipe temperature (line PT-1). Heating of the sleeve continues for 260 seconds, at which point the heating is stopped (identified by vertical line SH). The dashed line (TD-thin) at the bottom of the graph shows the temperature differential over time between the heated sleeve (ST-thin) and the underlying pipe temperature (PT-1). It is observed that the temperature differential (TD-thin) is initially zero since the pipe and sleeve are at the same ambient temperatures at time=0 seconds. The temperature differential (TD-thin) initially increases rapidly, within the first 50 seconds, as the sleeve is heated, and so the sleeve circumferentially expands, or stretches, relative to the underlying pipe (which slowly starts to experience heat transfer from the sleeve). From time=50 seconds to about time=100 seconds there is a marked reduction in the rate of increase of the temperature differential (TD-thin), as heat transfer from the sleeve to the pipe intensifies, and thus pipe expansion accelerates. Then, from at least time=100 seconds to time=260 seconds when heating stops (line SH), the temperature differential (TD-thin) substantially plateaus at under 100 degrees Fahrenheit (i.e. under 37 degrees Celsius) as the rise in the pipe temperature (PT-1) substantially matches the rise in the sleeve temperature (ST-thin). This plateau indicates a similar rate of expansion for both the sleeve and the pipe, and therefore a lack of incremental stretch of the sleeve relative to the pipe. After time=260 seconds when heating of the sleeve stops, the temperature differential (TD-thin) quickly begins to descend toward zero. The pipe temperature (PT-1) continues to increase for a time after heating stops as latent heat transfers from the hot sleeve to the pipe, but the sleeve temperature (ST-thin) begins to drop once heating stops. Eventually the pipe and sleeve temperatures reach an equilibrium, presumably at some ambient, wherein the temperature differential (TD-thin) returns to zero, at which point the stretch created by the heating process that could have been captured by the sleeve (had the sleeve segments been joined when heating stopped), to create a compressive force about the pipe, reduces to zero as well.

It is believed that the amount of stretch, and thus compressive force, that is realized is directly related to the maximum temperature differential (TD-thin) achieved during the heating process. Unfortunately, FIG. 1 illustrates that when using a conventional (aka "thin") sleeve the temperature differential quickly reaches a plateau, and thus additional heating after a certain point (in this instance past time=100 seconds) does not appear to result in an increase of the desired stretch and resultant compressive forces of the sleeve onto the pipe. This is particularly problematic for large pipes, where greater compressive forces from known sleeves are sought but seem unobtainable.

Surprising and unexpected results were achieved when, contrary to generally accepted convention, a novel steel sleeve was mounted on the same type of pipe as used for the FIG. 1 test. Referring next to FIG. 2, it shows the temperature profile of a "thick" sleeve (i.e. a sleeve thicker than the pipe wall) that is mounted externally on a steel pipe having substantially the same material properties as the sleeve. In this instance the sleeve wall thickness was chosen to be twice (2×) the pipe wall thickness. As before, heating of the sleeve commences at time=0 seconds and continues until time=260 seconds when heating is stopped (indicated by vertical line SH). The sleeve temperature (identified by the line ST-thick) remains consistently higher than the underlying pipe temperature (line PT-2). The temperature differential (TD-thick) at time=0 seconds is also initially zero since the pipe and sleeve are at the same ambient temperature. The temperature differential (TD-thick) increases at a rapid rate, within the first 50 seconds, as the sleeve is heated, and so the sleeve circumferentially stretches relative to the underlying pipe, which appears comparable to the FIG. 1 results.

However, surprising results are observed from time=50 seconds onwards. Rather than seeing a marked reduction in the rate of increase of the temperature differential (TD-thick), as was observed from time=50 to 100 seconds for the temperature differential (TD-thin) in FIG. 1, the temperature differential (TD-thick) in FIG. 2 continues to increase at a good rate. At time=100 seconds the temperature differential (TD-thick) continues to increase, and does not plateau as in FIG. 1. Rather, the temperature differential (TD-thick) in FIG. 2 rises during the entire heating process, until heating is stopped at time=260 seconds (line SH). Although FIG. 2 indicates that heat is transferred from the sleeve to the underlying pipe, since both the sleeve and pipe temperatures (ST-thick and PT-2, respectively) increase during heat application to the sleeve, but the rate of heat transfer from the sleeve to the pipe appears to be greatly reduced, as indicated by the gentler slope of the pipe temperature (PT-2) relative to the steeper slope of the sleeve temperature (ST-thick). This slower rate, or divergence, of the pipe temperature (PT-2) relative to the sleeve temperature (ST-thick) during heating results in the steady increase of the temperature differential (TD-thick) over that time frame. It suggests that the sleeve continues to circumferentially expand relative to the pipe in a sustained stretching throughout the heating process to time=260 seconds. It is theorized that where the sleeve is much thicker than the pipe, the heat transfer to the pipe is slowed and reduced (over a given time frame), as it takes more time for heat to transfer through a thick sleeve than through a thin sleeve. Consequently, the pipe temperature (PT-2) rises more gradually when using a thick sleeve compared to the steeper pipe temperature (PT-1) increase using a thin sleeve.

After heating stops (SH), the temperature differential (DT-thick) begins to fall toward zero, in a similar manner to the FIG. 1 test. The pipe temperature (PT-2) continues to increase for a time after heating stops as latent heat continues to transfer from the hot sleeve to the pipe, but the sleeve temperature (ST-thick) begins to drop once heating stops. Eventually the pipe and sleeve temperatures reach ambient wherein the temperature differential (TD-thick) returns to zero, at which point the stretch created by the heating process could have been captured by the sleeve (had the sleeve segments been joined when heating stopped), to create a compressive force about the pipe. However, compared to the thin sleeve in the FIG. 1 test, it is believed that the thick sleeve has realized a significantly greater stretch due to the higher temperature differential (TD-thick) achieved during the heating process. For the same amount of heat input, the maximum temperature differential (DT-thick) for the thick sleeve is roughly 240° F. (about 115° C.) which is about three (3.0) times greater than the approximately 80° F. (about 27° C.) temperature differential (DT-thin) maximum reached using the thin sleeve in FIG. 1. Hence, a comparison of the FIG. 1 and FIG. 2 results unexpectedly indicates that for the same amount of heat input over equal time periods, a much greater temperature differential is achieved with the thick sleeve over the thin sleeve, and so an apparently greater potential capture of circumferential stretch resulting in higher compressive forces exerted by the thick sleeve on the pipe than by the thin sleeve. This result is of particular relevance and importance for large diameter pipes, where greater compressive forces are desired.

These new and unexpected results have a fundamental impact in sleeve design for pipelines. They indicate that sleeve thickness is a relevant factor in designing external sleeves for pipes, that sleeves can be made thicker than the underlying pipe to be repaired, and specifically that thick sleeves can provide greater temperature differentials than thin sleeves, and so should create greater compressive forces on the pipe, particularly on larger diameter pipes.

The present invention further provides an improved arrangement and method for superior clamping of thick sleeves, as well as conventional thin sleeves, on a pipe.

Therefore, according to the present invention, there is provided in one aspect a method of repairing a longitudinal section of defective hollow pipe, whether perforated or unperforated, comprising:

providing at least two sleeve segments, each sleeve segment having a first wall thickness and an inside surface adapted to fit onto an outer surface of said pipe having a second wall thickness, said first wall thickness being greater than said second wall thickness;

preparing at least one of said outer surface of the pipe and said inside surface of the sleeve segments for receiving a binding agent;

applying said binding agent to at least one of said outer surface of the pipe and said inside surface of the sleeve segments;

mounting said sleeve segments onto said pipe with said binding agent located therebetween;

applying an initial clamping to place said sleeves in tension and thereby squeeze said sleeve segments onto said binding agent and said outer surface of the pipe;

heating said sleeve segments to a predetermined temperature above the ambient temperature of the pipe to attain a given temperature differential between the sleeve segments and pipe with the chosen first and second wall thickness, respectively;

joining said sleeve segments while expanded to form a continuous sleeve circumferentially about said pipe; and, removing said clamping, and allowing said sleeve and pipe to cool to said ambient temperature to form an interference fit therebetween and to seal said section of pipe to avoid leakage of product therefrom, wherein said predetermined temperature to which said sleeve segments are heated provides sufficient thermal expansion of said sleeve segments relative to said pipe so that upon said joining and subsequent cooling said sleeve remains in tension and provides sufficient compressive forces onto said pipe whether said pipe is internally pressurized or depressurized.

In another aspect the invention provides A sleeve assembly for repairing a longitudinal section of defective hollow pipe comprising:

a binding agent; and first and second sleeve segments adapted to fit onto an outer surface of a wall of said pipe so as to substantially circumferentially encompass said pipe, each of said sleeve segments having a sleeve wall thicker than said pipe wall;

said sleeve assembly being formed by:

preparing at least one of said outside surface of said pipe and said sleeve segments for contact with said a binding agent;

coating said outside surface of said pipe with said binding agent and placing said sleeve segments over said binding agent;

applying a radial clamping force to squeeze said sleeve segments onto said outer surface of said pipe;

heating said sleeve segments to thermally expand said sleeve segments relative to said pipe;

adjusting said clamping force to maintain said sleeve segments squeezed onto said outer surface of said pipe;

joining said sleeve segments together about said pipe with connector plates while said sleeve segments are thermally expanded;

removing said clamping force; and forming an interference fit between said sleeve assembly and said pipe by cooling said sleeve segments.

BRIEF DESCRIPTION OF THE DRAWING FIGURES

Embodiments of the invention will now be described, by way of example only, with reference to the accompanying drawings, wherein:

FIG. 6 shows the top sleeve of FIG. 4, in isolation, with lugs fixed thereto according of the preferred embodiment of the clamping assembly;

FIG. 6a is a close-up of a part of FIG. 6, identified by 6a, showing a lug of the present clamping assembly in isolation;

DETAILED DESCRIPTION OF THE INVENTION

Figure 1:
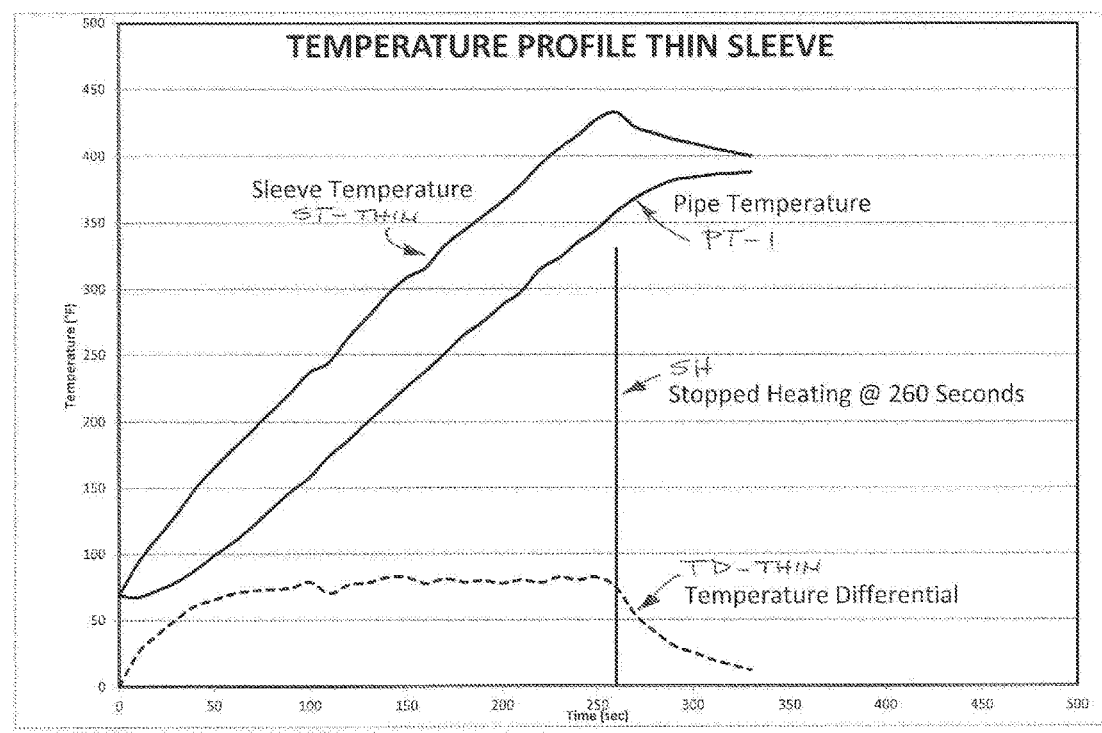
FIG. 1 is a graph showing the temperature profile of a conventional sleeve, also referred to herein as a "thin" sleeve, mounted on a pipe, with heat applied to the thin sleeve over a given time frame.

The figures show an improved sleeve, namely a novel "thick" sleeve generally indicated by reference numeral 20, and clamping assembly 50 according to a preferred embodiment of the invention for mounting the improved thick sleeve 20 onto a longitudinal section of hollow pipe 10 requiring repair, to prevent rupture or leakage of a defect (shown in ghost at 16) in the pipe wall 12. Repair includes reinforcement or pressure containment of the defective pipe. The defect may be of the variety found in an unperforated pipe, such as a stress crack, an area of pipe wall degradation due to corrosion, or a dent. However, importantly, the improved thick sleeve 20 may also be used for defects of the variety found in a perforated pipe, where the anomaly extends radially through the pipe wall 12. For illustrative purposes, the pipe 10 is a large diameter variety (30 in/76 cm or greater) used for pipelines which transport large volumes of hydrocarbons under great pressure, such as a natural gas or oil, over long distances, for which the improved thick sleeve 20 and clamping arrangement can be employed. It will be appreciated, however, that the improved thick sleeve and clamping arrangement is not restricted to use on such large pipes but is also suitable for use on small diameter pipes (under 30 in/76 cm) and on various types of pipes as well, such as those used for transporting drinking water, sewage, and a host of other liquids and gases, whether pressurized or not. The pipes may be located above or below ground, can be subject to internal pressure fluctuations, internal and external temperature fluctuations, and to both internal and external corrosive agents.

Figure 3:
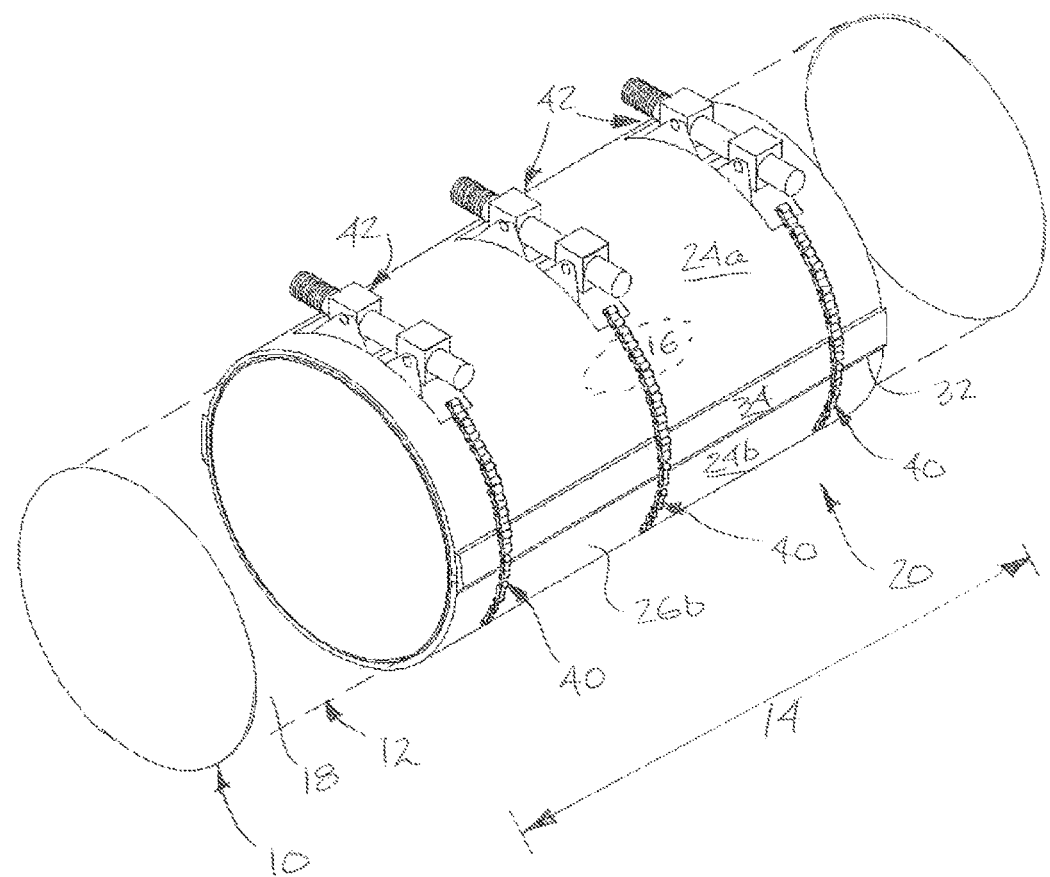
FIG. 3 is a perspective view of a thick sleeve according to the present invention mounted onto a longitudinal section of hollow pipe and retained thereon with a known clamping arrangement during the external pipe reinforcement installation process.
Figure 3A:
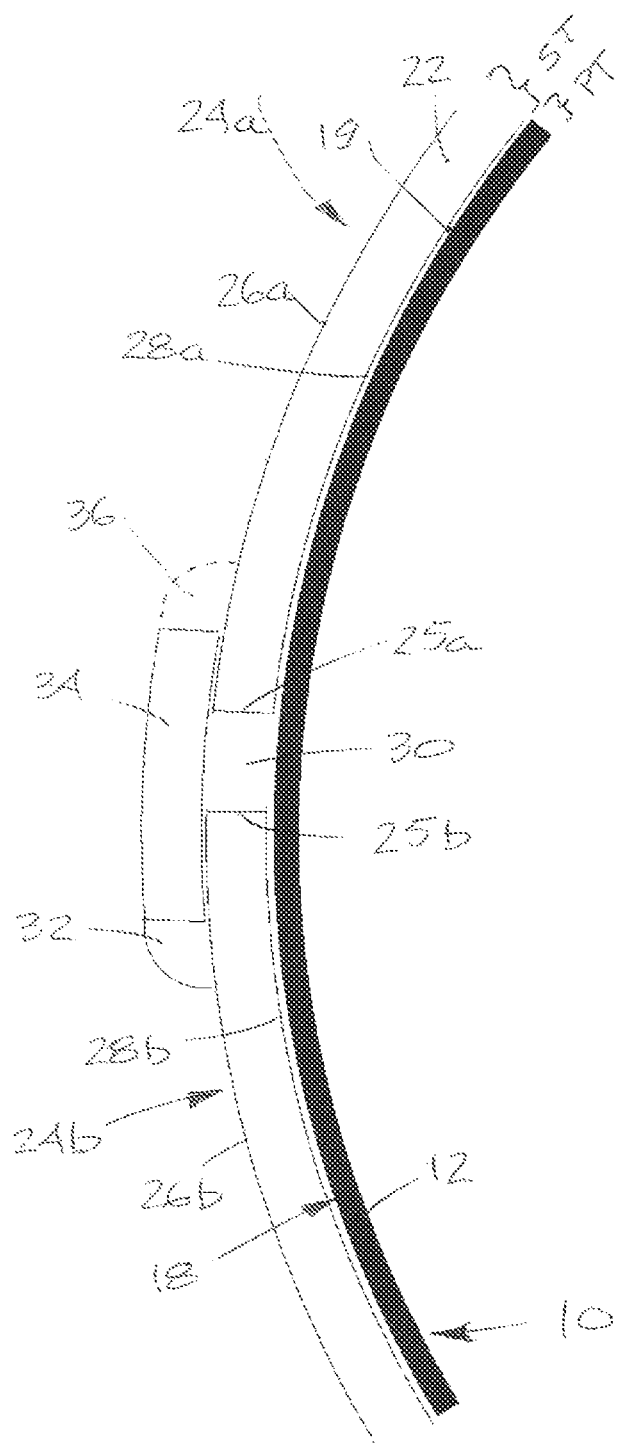
FIG. 3a is an end view of FIG. 3 showing a circumferential portion of the thick sleeve mounted on the pipe, prior to completion of welding of the connector plate.

Referring first to FIGS. 3 and 3a, a length of pipe (indicated by 14) is chosen for repair which extends a given distance to either side of the defect 16 in the pipe wall 12. Along that length 14 of pipe the generally cylindrical outer surface 18 of the pipe wall 12 should be prepared for receiving a binding agent 19, such as an epoxy, and the improved thick sleeve 20. Since the pipe 10 is typically constructed of plate steel and has been exposed to the elements for some time, the outer surface 18 should be cleaned, as by sand-blasting, of rust and any foreign substances (e.g. oil) to allow the epoxy to bind thereto and to provide good contact with the sleeve.

Figure 2:
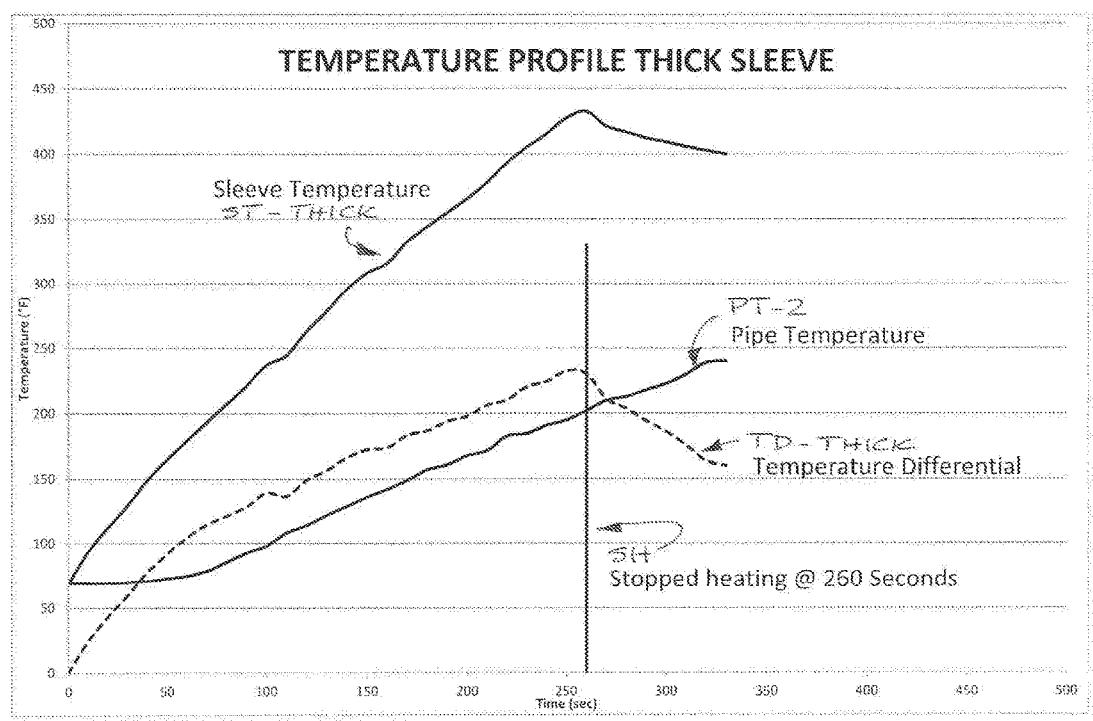
FIG. 2 is a graph showing the temperature profile of a new sleeve according to a preferred embodiment of the present invention, also referred to herein as a "thick" sleeve, mounted on a pipe, with the same heat applied to the thick sleeve over the same time frame as in FIG. 1.

The improved thick sleeve 20 has a wall 22 whose thickness ST is greater than the pipe's wall thickness PT. In general, the improved sleeve thickness ST should be up to 3 times that of the pipe thickness PT, but could be more than 3 times if required, and a preferred range for the sleeve wall thickness for typical use is about 1.5 to 3 times the pipe wall thickness, depending on the desired compression and design parameters. In the instant example in FIG. 3a the ratio of the sleeve thickness ST to the pipe thickness PT is chosen to be about 2:1 (i.e. twice (2×) the pipe thickness PT). The improved thick sleeve 20 is composed of two segments 24a, 24b, each shaped and sized to encircle slightly less than half of the pipe wall 12 in order to fit onto the pipe. In the FIG. 3 orientation the sleeve segment 24a is considered a top segment whereas the sleeve segment 24b is considered a bottom segment due to its location beneath the pipe. Each sleeve segment 24a, 24b is formed of plate steel with an outside surface 26a and 26b, respectively, and an inside surface 28a and 28b, respectively, having a radius of curvature generally matching that of the pipe's outer surface 18 so as to fit thereon. The top and bottom sleeve segments combined substantially encompass the pipe circumferentially, leaving a small longitudinal gap 30, typically about 0.25 to 0.50 inches (about 0.6 to 1.3 cm), between facing ends 25a, 25b of the sleeve segments on opposed sides of the pipe to accommodate thermal expansion of the sleeve segments. Prior to installation, the inside sleeve surfaces 28a, 28b should be cleaned of rust and any foreign substances to allow the epoxy to bind thereto, which may be done on site or in the shop. The sleeve segments may be formed of material other than plate steel, such a stainless steel which is also easy to weld. If the sleeve and pipe are of different materials, then care must be taken to choose a sleeve material which will translate the temperature differential (TD-thick in FIG. 2) into a sleeve "stretch" that ultimately provides adequate compression on the underlying pipe. It is preferable and most convenient, however, that the improved thick sleeve segments be formed of material which matches or is complementary to that of the pipe 10, to also avoid promoting corrosion by setting up a cathodic cell or reaction therebetween. It is noted that terms such as "top", "bottom", "inside", "outside" and the like are used for identifying certain features of the invention relative to a generally horizontally oriented pipe. The use of such terms is not intended to limit the invention's use or orientation. Further, when describing the invention, all terms not defined herein have their common art-recognized meaning.

A connector plate 34, also referred to as a "connector" or "zipper", is secured to the opposed ends of one of the sleeve segments, preferably with a fillet weld 32. Typically the fillet welds are made prior to installing the sleeve segments onto the pipe, so that the welding can be preformed more easily from above the connector. The sleeve segment with the welded connectors is then best used as the bottom sleeve segment 24b during the installation process, so that subsequent fillet welds (shown in ghost at 36) between the connectors and the top sleeve segment 24a are done more easily from above. Although the initial welds 32 of the connectors could be delayed until the sleeve segments and connectors are first clamped onto the pipe during the sleeve installation process, this option is not preferred because of greater handling difficulties. Each connector 34 should be wide enough to extend circumferentially beyond the opposed longitudinal edges 25b of the bottom sleeve segment 24b, and across the gap 30, so as to overlap with the outside surface of the top sleeve segment 24a, as seen in FIG. 3a, sufficient for subsequent securing with the fillet welds 36. The connector should be of a complementary or matching material to that of the sleeve segments to minimize or avoid cathodic reaction therebetween, and its thickness should be at least that of the sleeve ST to avoid being a point of weakness ("weak link") for rupture at the joint 30. Each connector may be composed of several plates, if desired, and may also be formed integrally with the sleeve segment. Alternative joining means may be used, such as hinges or bolts, but this is not preferred.

A known clamping arrangement for use during the sleeve installation process is shown in FIG. 3. The arrangement has one or more chain assemblies 40, depending on the length 14 of sleeve needed for the pipe repair. A screw jack 42, or alternately a hydraulic jack (not shown) is used on each chain 40 to exert a radial clamping force to squeeze the sleeve onto the pipe during installation. However, a superior and improved clamping assembly 50 for the same type of improved thick sleeve 20 as in FIG. 3 is illustrated in FIGS. 4 to 7b. It has been found to provide an efficient clamping means for improved thick sleeves of the present invention and large diameter pipes, and performs equally well on small diameter pipes. Each clamp assembly 50 has at least one pair of clamping mechanisms 52 oriented on opposed sides of the improved thick sleeve 20, spanning the gaps 30. In the FIG. 4 embodiment there are three longitudinally spaced pairs of clamping mechanisms 52 provided due to the length 14 of the repair area and sleeve. Each clamping mechanism 52 has two main components, namely lugs 60 mounted on the sleeve segments and an improved screw jack 70 for engaging corresponding pairs of lugs 60.

Figure 4:
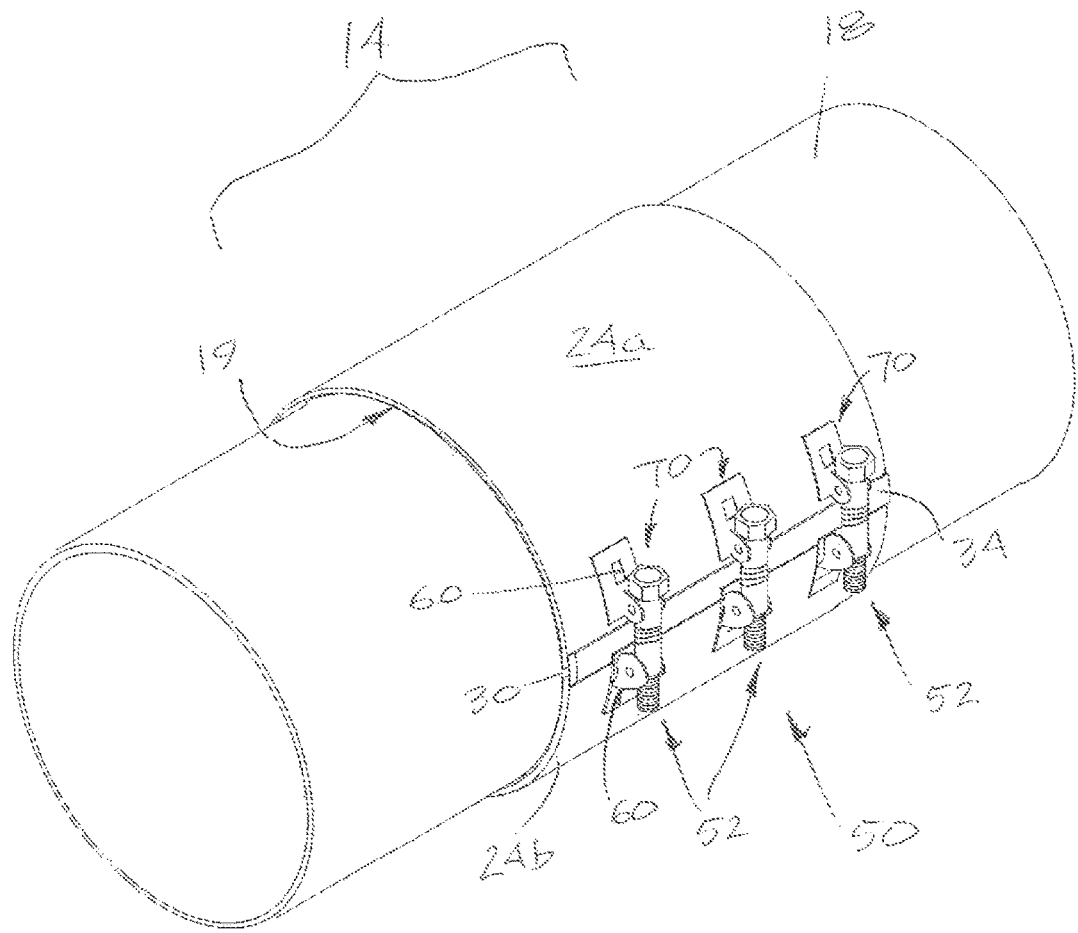
FIG. 4 is a view similar to FIG. 3, except showing the thick sleeve retained on the pipe using a clamping assembly according to a preferred embodiment of the present invention.
Figure 5:
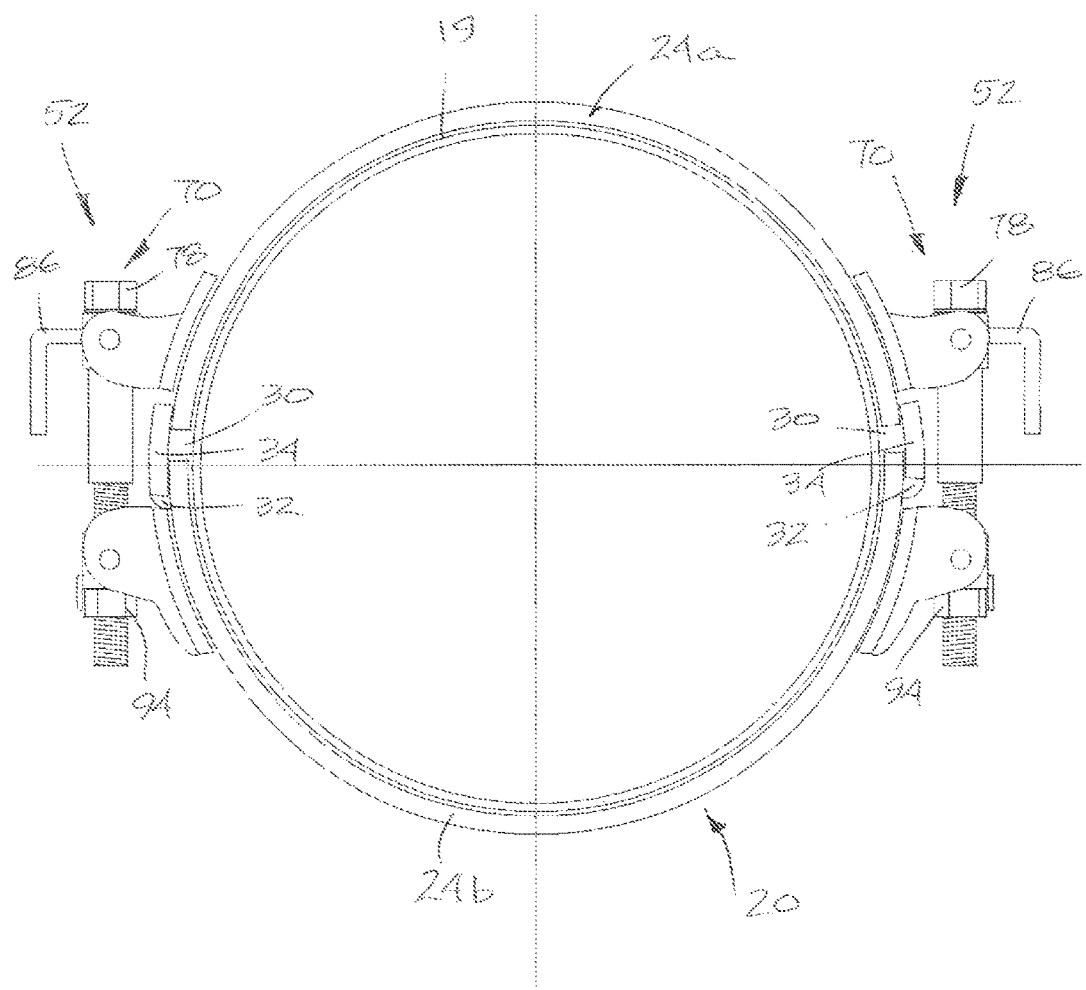
FIG. 5 is an end view of FIG. 4.

Referring to FIG. 6 showing a top sleeve segment 24a, the three longitudinally lugs 60 (also known as "dogs") are connected, as by welding, to the sleeve segment's outer surface 26a an appropriate circumferential distance from its longitudinal edge 25a so as not to interfere with placement of the connectors 34 onto the sleeve segments (as in FIGS. 4 and 5). A corresponding set of lugs 60 (obstructed from view in FIG. 6) is likewise located along and above the opposed longitudinal edge 25a' of the sleeve segment 24a. Such lugs 60 are similarly connected on the bottom sleeve segment 24b. Referring also to FIG. 6a, each lug 60 has an inside face 62 that contacts the sleeve's outside surface 26a when the lug is welded thereto. Each lug has an end 64 notched at 66 to form a lip 68, and the lug is fixed to the sleeve such that the lip 68 is spaced outwardly from the sleeve's outside surface 26a and points circumferentially away from the nearest longitudinal edge 25a, 25a' (FIG. 6).

Figure 7A:
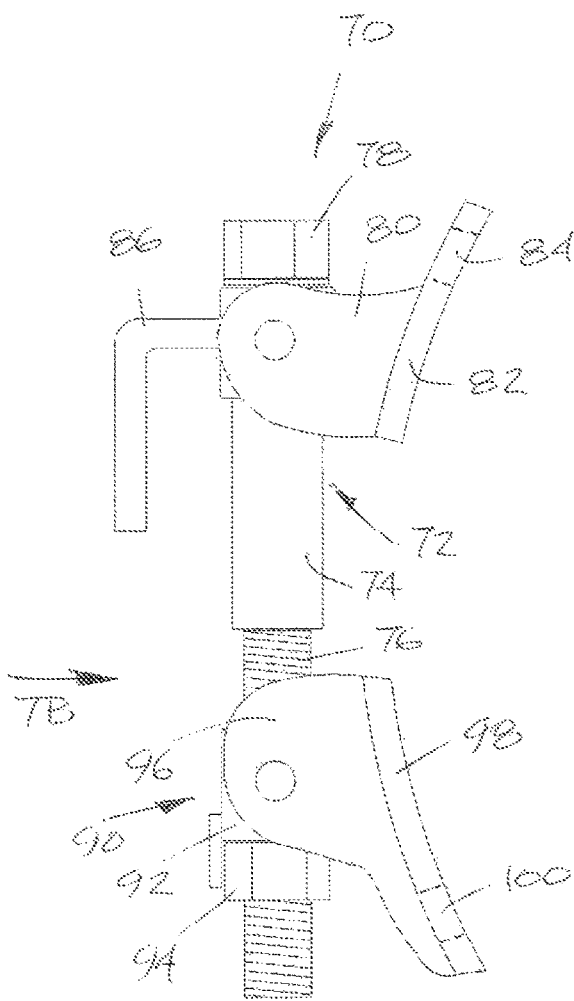
FIG. 7a shows a screw jack of the present clamping assembly of FIG. 5 in isolation; and, FIG. 7b shows the screw jack of FIG. 7a in the direction of arrow 7b, namely rotated counter-clockwise 90° about a vertical axis.
Figure 7B:
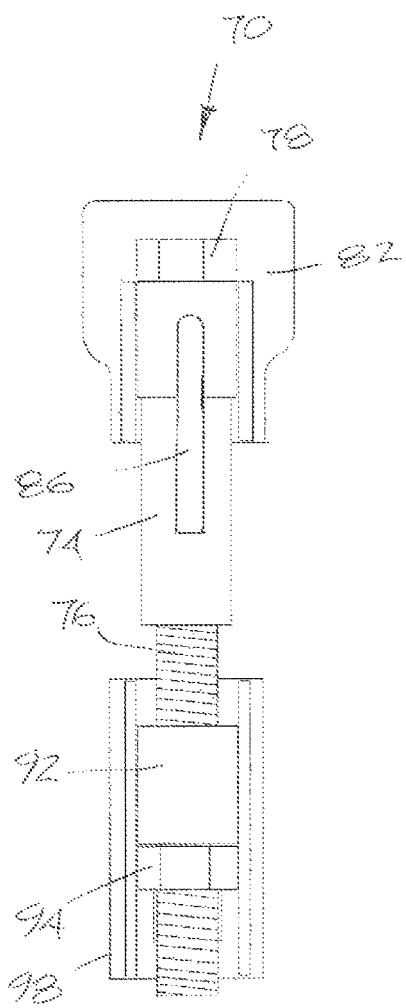

The screw jacks 70 for engaging these lugs 60 are shown in more detail in FIGS. 7a and 7b. Each screw jack has a first, upper body 72 with a hollow cylindrical portion 74 sized to slidingly receive an elongate threaded bolt 76 therethrough. One end of the bolt has an enlarged hex-shaped head 78 which stops the bolt from sliding through the cylindrical portion 74. A first, or upper arm 80 is pivotally mounted to the cylindrical portion 74 and has a bowed shoulder 82 adapted to generally match the contour of the sleeve's outside surface 26a. The shoulder 82 has an aperture 84 therein shaped and sized for engaging a lug 60 by fitting over the lip 68 and nesting with the lug's notch 66.

The aperture 84 is long enough to allow the sleeve segment to circumferentially expand by allowing the nested lug to move within the aperture after clamping and during heating. An inverted L-shaped handle 86 (seen in FIGS. 5 and 7a, but omitted from FIG. 4) protrudes outwardly from the upper body 72 as a convenient means for a user to lift the screw jack 70 off a hot sleeve upon completion of installation, as explained later. Each screw jack further has a second, lower body 90 below the upper body 72, and likewise has hollow cylindrical portion 92 sized to slidingly receive the bolt 76 therethrough. A nut 94 is located on the threads of the bolt 76 below the cylindrical portion 92 to control and fix longitudinal movement of the bolt relative to the lower body 90. It will be appreciated that the lower cylindrical portion 92 may optionally be internally threaded for engaging the bolt 76 as well. A second, or lower arm 96 is pivotally mounted to the lower cylindrical portion 92 and has a bowed shoulder 98 adapted to generally match the contour of a bottom sleeve's outside surface 26b. The shoulder 98 likewise has an aperture 100 therein with the same properties and functions as the aperture 84.

Once the screw jacks 70 are mounted on the lugs of adjacent sleeves, spanning across the gaps 30 and the connectors 34 as shown in FIG. 5, the nut 78 is manipulated to move the upper and lower jack bodies 72, 90 relative to each other, to provide the necessary initial radial clamping force for squeezing the top and bottom sleeve segments 24a, 24b onto the epoxy and the pipe's outer surface, prior to heating and welding. Any number of screw jacks may be employed depending on the desired clamping force and the length of the sleeve segments used. In the FIG. 4 embodiment there are three spaced screw jacks 70 on each side of the sleeve to clamp the top and bottom sleeve segments 24a, 24b together, in preparation for welding of the connector 34 on each side.

The method of repairing the pipe 10 by mounting and forming a sleeve thereon according to a preferred embodiment of the invention will now be described in further detail. Once the pipe's outer surface 18 and the inside surfaces 28a, 28b of the sleeve segments are prepared as previously mentioned, a layer of epoxy 19 is applied around the pipe to its outer surface 18 along the length 14 to be repaired. Alternately, or concurrently, epoxy might be applied to the inside surfaces 28a, 28b of the sleeve segments, but generally this is not as convenient. Next, the top sleeve segment 24a (with the lugs 60 already fixed thereto, as in FIG. 6) and the bottom sleeve segment 24b (with the lugs and the connector plates 34 already welded thereto as in FIG. 3a) are then placed onto the pipe's outer surface 18 over the epoxy layer 19 and held in place by engaging the clamp mechanisms 52. The clamp mechanisms 52 are engaged by nesting each screw jack 70 with a corresponding pair of lugs 60 on either side of the connector plates 34. Once all screw jacks 70 are mounted to the sleeve, a first, initial tightening is made to tightly clamp the top and bottom sleeve segments 24a, 24b to the pipe, by twisting the bolt heads 78, to arrive at a configuration shown in FIGS. 4 and 5. The number of clamp mechanisms 52 employed may vary from the three pairs employed in the FIG. 4 embodiment, depending on the desired clamping force and the length 14 of pipe to be repaired. For instance, greater clamping forces may be required where a pipe is depressurised during installation, as certain pipes which are generally round when pressurized can turn oval upon depressurization. Good results have also been achieved for smaller diameter pipes using the chain assembly 40 (as in FIG. 3) to provide the necessary radial clamping force for squeezing the sleeve segments onto the epoxy and the pipe's outer surface.

Once the sleeve segments are initially tightened to the pipe, heat is next applied to the clamped sleeve segments, using torches or other suitable means, to thermally expand the sleeve segments 24a, 24b. While in their expanded state, the screw jacks 70 are again tightened for a second time to tightly clamp the hot top and bottom sleeve segments 24a, 24b by turning each bolt head 78 as before, so as to capture the "stretch" of the sleeve segments relative to the underlying pipe. Once this second tightening is made, and while the sleeve segments remain hot, both connector plates 30 are welded along their top edges (as indicated by 36 in FIG. 3a), thereby joining both top and bottom "stretched" sleeve segments together to form a continuous "stretched" improved thick sleeve 20 circumferentially about the length 14 of pipe to be repaired, which should translate into the desired compressive forces on the pipe upon subsequent cooling of the sleeve.

Since the clamping force of the clamp assembly 50 is no longer required after welding of the connectors is completed, each screw jack 70 is then removed by loosening the bolt heads 78, so as to allow the screw jacks to be un-seated from the respective lugs 60, and thus removed from the pipe. Since the screw jack is typically still hot at this stage, a user's gloved hand can conveniently grip the handle 86 on each jack to lift the jack off the lugs and sleeve. The lugs 60 may remain permanently attached to the sleeve, or be removed if desired, as by grinding.

As the sleeve is allowed to cool to the same temperature as the pipe, both sleeve and pipe eventually reaching the same ambient temperature, the sleeve's plate steel contracts to form an interference fit with the pipe, thereby reinforcing and sealing the defective portion of pipe with the aid of the epoxy. Following cooling of the sleeve, corrosion inhibiting material (tar of a spray-on type, for instance) may be wrapped or otherwise applied to the sleeve and adjacent pipe, and the excavation about the pipe repair area may be backfilled over the sleeve (assuming the repaired pipe is located underground).

The heating rate and duration employed for the improved thick sleeve of the present invention depends on the temperature differential (TD-thick in FIG. 2) and compressive forces desired for the pipe being repaired. These parameters will vary depending on factors such as the materials of the pipe and sleeve, the temperature curing range of the epoxy, the size of the pipe in question, whether the defect is one which perforates the pipe wall or not, and the thickness of the sleeve chosen relative to the pipe thickness.

Several advantages and benefits of the present invention may now be better appreciated. First, the improved thick sleeve, which is thicker than the pipe to be repaired, by up to twice the pipe's thickness or more, provides surprising and unexpected results during the sleeve heating process, namely that the temperature differential between the sleeve and pipe continues to rise over a given time and does not readily plateau as do prior art (thin) sleeves. This is believed to result in a greater stretch for the thick sleeve than a thin sleeve, and thus generate greater compressive forces on a pipe for a given heat input. The improved thick sleeve has been found to be particularly suitable for large diameter pipe due to the compressive forces that can be realized, although it is equally suitable for small diameter pipes as well. Importantly, it is considered suitable for repairing a wide variety of pipe defects, including defects which perforate the pipe wall, for which prior art (thin) sleeves were considered unsuitable.

Second, the clamping assembly for the improved thick sleeve provides an efficient means of clamping sleeve segments with greater circumferential pull than prior art assemblies employing circumferential chains. The force from the screw jacks transfers directly to the lugs fixed on the sleeve segments and thus an immediate transfer to the sleeve segments to create the desired circumferential tensile forces, to pull the sleeve segments towards each other. This differs significantly from the prior art chain mechanisms which rely on a less efficient squeezing and flexing of the sleeves by the chains to partly translate into tension on the sleeve segments. The improved screw jack clamping assembly may also be used effectively on small diameter pipes.

The scope of the claims below should not be limited by the preferred embodiments set forth herein (in the examples), but should be given the broadest interpretation consistent with the above description as a whole.

We claim:

1. A method of repairing a longitudinal section of defective hollow pipe, whether perforated or unperforated, comprising:
providing at least two sleeve segments, each sleeve segment having a first wall thickness and an inside surface adapted to fit onto an outer surface of said pipe having a second wall thickness, said first wall thickness being greater than said second wall thickness;
preparing at least one of said outer surface of the pipe and said inside surface of the sleeve segments for receiving a binding agent;
applying said binding agent to at least one of said outer surface of the pipe and said inside surface of the sleeve segments;
mounting said sleeve segments onto said pipe with said binding agent located therebetween;
applying an initial clamping to place said sleeves in tension and thereby squeeze said sleeve segments onto said binding agent and said outer surface of the pipe;
heating said sleeve segments to a predetermined temperature above the ambient temperature of the pipe to attain a given temperature differential between the sleeve segments and pipe with the chosen first and second wall thickness, respectively, whereby said first thickness of said sleeve segments prevents said temperature differential from reaching a plateau below a temperature differential of 100° F.;
joining said sleeve segments while expanded to form a continuous sleeve circumferentially about said pipe; and,
removing said clamping, and allowing said sleeve and pipe to cool to said ambient temperature to form an interference fit therebetween and to seal said section of pipe to avoid leakage of product therefrom, wherein said predetermined temperature to which said sleeve segments are heated provides sufficient thermal expansion of said sleeve segments relative to said pipe so that upon said joining and subsequent cooling said sleeve remains in tension and provides sufficient compressive forces onto said pipe to prevent detachment therefrom whether said pipe is internally pressurized or depressurized.

2. The method of claim 1 comprising providing sleeve segments having a first wall thickness up to 3 times said second wall thickness.

3. The method of claim 1 comprising providing sleeve segments having a first wall thickness in the range of 1.5 to 3 times said second wall thickness.

4. The method of claim 1 comprising providing sleeve segments having a first wall thickness to second wall thickness ratio of about 2:1.

5. The method of claim 1 wherein said joining comprises fixing at least one connector to each pair of facing opposed ends of said sleeve segments to form said sleeve.

6. The method of claim 5 wherein said connectors are fixed to the opposed ends of at least one of said sleeve segments prior to said placing of said sleeve segments onto said binding agent.

7. The method of claim 6 wherein said fixing comprises welding said connectors to said sleeve segments.

8. The method of claim 5 wherein each pair of said facing ends is spaced apart to provide a gap for said thermal expansion of said sleeve segments.

9. The method of claim 1 wherein prior to joining said sleeve segments said initial clamping is adjusted to maintain said sleeve segments in tension after said thermal expansion.

10. The method of claim 9 comprising providing sleeve segments having a first wall thickness up to 3 times said second wall thickness wherein said joining comprises welding at least one connector to each pair of facing opposed ends of said sleeve segments to form said sleeve, said connectors being fixed to the opposed ends of at least one of said sleeve segments prior to said placing of said sleeve segments onto said binding agent, and each pair of said facing ends being spaced apart to provide a gap for said thermal expansion of said sleeve segments.

11. A sleeve assembly for repairing a longitudinal section of defective hollow pipe comprising:
a binding agent;
first and second sleeve segments adapted to fit onto an outer surface of a wall of said pipe so as to substantially circumferentially encompass said pipe but leaving a gap at least equal to anticipated thermal expansion of said sleeve segments, each of said sleeve segments having a sleeve wall thicker than said pipe wall such that, when said sleeve segments are attached to said pipe and heated, a temperature differential between said sleeve segments and said pipe does not plateau at a temperature differential below 100° F.;
and connector plates for engaging said first and second sleeve segments;
said sleeve assembly being formed by:
preparing at least one of said outside surface of said pipe and said sleeve segments for contact with said binding agent;
coating at least one of said outside surface of said pipe and said sleeve segments with said binding agent and placing said sleeve segments over said pipe;
applying a clamping force to squeeze said sleeve segments onto said outer surface of said pipe;
heating said sleeve segments to thermally expand said sleeve segments relative to said pipe at a temperature differential of 100° F. or more between said sleeve segments and said pipe;
adjusting said clamping force to maintain said sleeve segments squeezed onto said outer surface of said pipe;
joining said sleeve segments together about said pipe with said connector plates while said sleeve segments are thermally expanded;
removing said clamping force; and
forming an interference fit between said sleeve assembly and said pipe as said temperature differential is reduced.

12. The sleeve assembly of claim 11 wherein said sleeve wall is up to 3 times the thickness of said pipe wall.

13. The sleeve assembly of claim 12 wherein said connector plates are welded to the opposed ends of said first sleeve segment prior to said placing of the sleeve segments over said pipe so that upon said heating of said sleeve segments said connector plates need only be welded to respective ends of said second sleeve segment, said sleeve segments are formed of material substantially similar to that of said pipe to minimize cathodic reaction therebetween, and said clamping force is provided by a clamping assembly having a first lug connected to said first sleeve segment, a second lug connected to said second sleeve segment, and a screw jacking device for engaging said first and second lugs to draw said sleeve segments together.

14. The sleeve assembly of claim 11 wherein said sleeve wall is in the range of 1.5 to 3 times the thickness of said pipe wall.

15. The sleeve assembly of claim 11 wherein said sleeve wall and said pipe wall have a general thickness ratio of 2:1.

16. The sleeve assembly of claim 15 further comprising a corrosion inhibiting material located over said joined sleeve segments, wherein said connector plates are welded to the opposed ends of said first sleeve segment prior to said placing of the sleeve segments over said pipe so that upon said heating of said sleeve segments said connector plates need only be welded to respective ends of said second sleeve segment, said sleeve segments are formed of material substantially similar to that of said pipe to minimize cathodic reaction therebetween, and said clamping force is provided by a clamping assembly having a first lug connected to said first sleeve segment, a second lug connected to said second sleeve segment, and a screw jacking device for engaging said first and second lugs to draw said sleeve segments together.

17. The sleeve assembly of claim 11 wherein said connector plates are welded to the opposed ends of said first sleeve segment prior to said placing of the sleeve segments over said pipe so that upon said heating of said sleeve segments said connector plates need only be welded to respective ends of said second sleeve segment.

18. The sleeve assembly of claim 17 wherein said sleeve segments are formed of material substantially similar to that of said pipe to minimize cathodic reaction therebetween.

19. The sleeve assembly of claim 18 further comprising a corrosion inhibiting material placed over said joined sleeve segments following cooling of said sleeve assembly.

20. The sleeve assembly of claim 11 wherein said clamping force is provided by a clamping assembly comprising a first lug connected to said first sleeve segment, a second lug connected to said second sleeve segment, and a screw jacking device for engaging said first and second lugs to draw said sleeve segments together to cause tension in a circumferential direction in said sleeve segments.

* * * * *